United States Patent [19]
Amakawa et al.

[11] Patent Number: 5,764,370
[45] Date of Patent: Jun. 9, 1998

[54] ENLARGEMENT AND REDUCTION APPARATUS FOR AN IMAGE FORMING APPARATUS

[75] Inventors: Katsumi Amakawa; Haruo Yamamoto; Masaya Fujimoto, all of Osaka, Japan

[73] Assignee: Mita Industrial Co., Ltd., Osaka, Japan

[21] Appl. No.: 373,389

[22] Filed: Jan. 17, 1995

[30] Foreign Application Priority Data

Jan. 18, 1994 [JP] Japan ................................ 6-003497

[51] Int. Cl.⁶ ........................................... H04N 1/46
[52] U.S. Cl. ................ 358/298; 358/451; 399/196; 382/298
[58] Field of Search ................. 358/296, 298–300, 358/444–451; 395/102, 128; 382/298, 299, 254, 257; 355/243, 208; 399/196, 197

[56] References Cited

U.S. PATENT DOCUMENTS

| 5,189,529 | 2/1993 | Ishiwata et al. | 358/451 |
| 5,398,117 | 3/1995 | Suzuki et al. | 358/451 |
| 5,535,007 | 7/1996 | Kim | 358/296 |

*Primary Examiner*—Peter S. Wong
*Assistant Examiner*—Gregory J. Toatley, Jr.
*Attorney, Agent, or Firm*—Beveridge, DeGrandi, Weilacher & Young, LLP

[57] ABSTRACT

An image forming apparatus is provided with a zoom processing circuit, a scanning optical system and an enlarging/reducing circuit. The enlargement/reduction of the formed image in the main scanning direction is performed by the zoom processing circuit and an enlarging/reducing circuit, and the enlargement/reduction in the sub scanning direction is performed by the scanning speed of the scanning optical system and the enlarging/reducing circuit. When a magnification within a magnification range depending on the zoom processing circuit and the scanning optical system is specified, the enlargement/reduction of the input image data by the enlarging/reducing circuit is not performed.

14 Claims, 11 Drawing Sheets

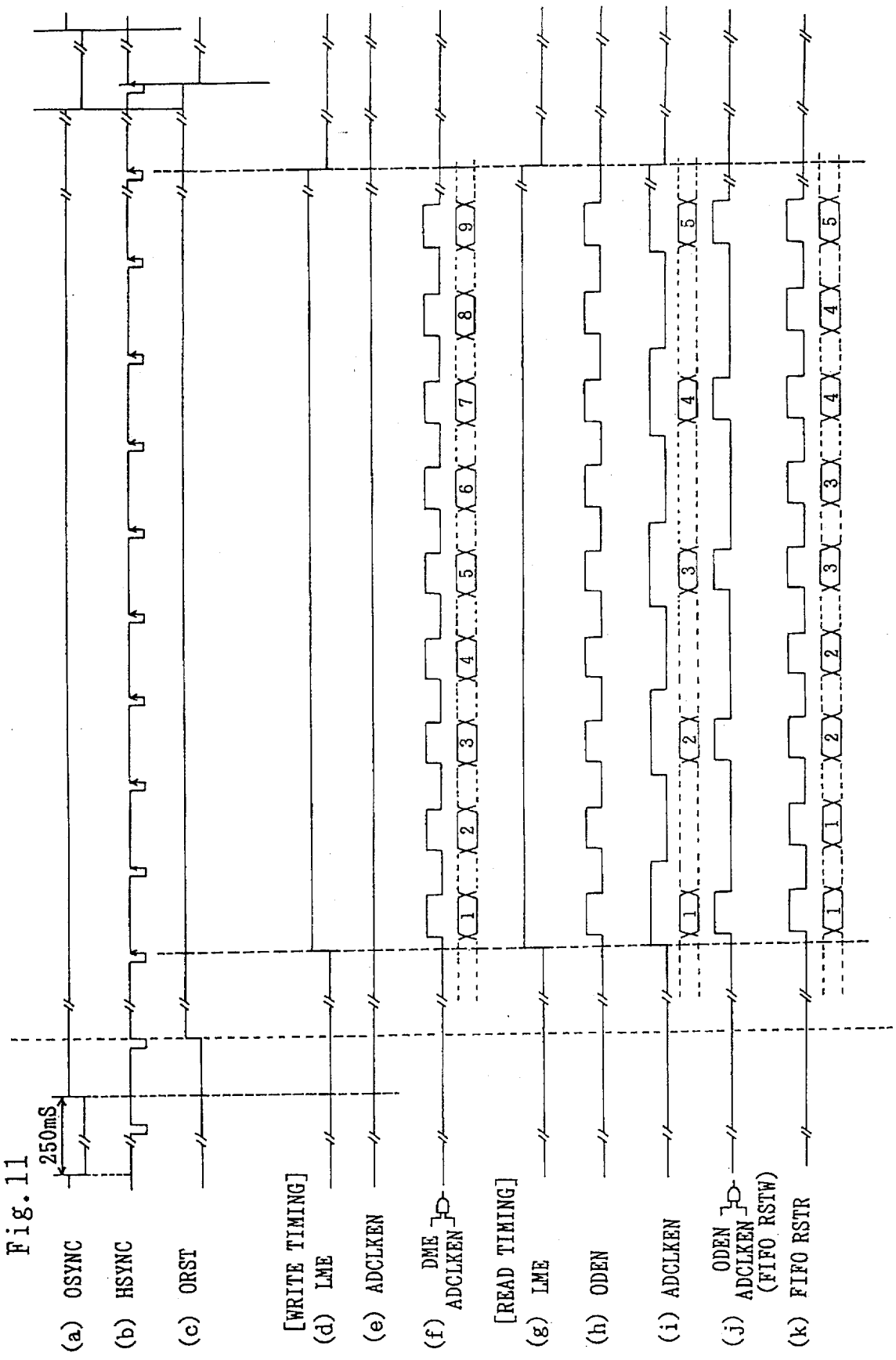

ENLARGEMENT AND REDUCTION APPARATUS FOR AN IMAGE FORMING APPARATUS

BACKGROUND OF THE INVENTION

1. Field of the Invention

The present invention relates to an image forming apparatus such as a digital electrographic copying machine, a printer and a facsimile apparatus.

2. Description of the Prior Art

For example, an electrographic copying machine generally has a zooming function and is capable of enlarging and reducing an original image in the sub scanning direction by controlling the scanning speed of the scanning optical system. However, since the zooming of the optical system is limited to the sub scanning direction, the enlargement/reduction processing of the image data in the main scanning direction is further performed by a zoom processing circuit using a line memory. As a result, a magnification can be set within a range from 50% to 400%.

In the conventional image forming apparatus, the obtained magnification range is at most from 50% to 400% as described above. However, a greater magnification range is sometimes desired in image formation.

SUMMARY OF THE INVENTION

An object of the present invention is to provide an image forming apparatus which realizes a greater magnification range with a comparatively simple arrangement.

To achieve the above-mentioned object, according to the present invention, in an image forming apparatus which prints out an image based on an input image data, the enlargement/reduction of the input image data is performed by an enlarging/reducing circuit using a circuit which writes and reads the input image data to and from an image memory.

Further, a zoom processing circuit and a scanning optical system are provided. The enlargement/reduction of a formed image in the main scanning direction is performed by the zoom processing circuit and the enlarging/reducing circuit. The enlargement/reduction in the sub scanning direction is performed by the scanning speed of the scanning optical system and the enlarging/reducing circuit.

In this case, when a magnification within a magnification range depending on the zoom processing circuit and the scanning optical system is specified, the enlargement/reduction of the input image data by the enlarging/reducing circuit is not performed. When a magnification lower than the lower limit of the magnification range is specified, the image data is reduced to ½ by the enlarging/reducing circuit, and the desired reduction is achieved by the reduction to ½ and a reduction operation by the zoom processing circuit and the scanning optical system. When a magnification higher than the upper limit of the magnification range is specified, the image data is enlarged twice by the enlarging/reducing circuit, and the desired enlargement is achieved by the twice enlargement and an enlargement operation by the zoom processing circuit and the scanning optical system.

The enlarging/reducing circuit has an input line memory and an output line memory for counting timing of the image data. During reduction, the enlarging/reducing circuit reduces the image data in the main scanning direction by the input line memory and writes the reduced image data to the image storing memory. The image data is reduced in the sub scanning direction when written in the memory.

BRIEF DESCRIPTION OF THE DRAWINGS

This and other objects and features of this invention will become clear from the following description, taken in conjunction with the preferred embodiments with reference to the accompanied drawings in which:

FIG. 11 is a time chart of signals relating to a sub scanning direction operation of the image memory and the output FIFO at the time of enlargement.

DESCRIPTION OF THE PREFERRED EMBODIMENTS

Figure 1:
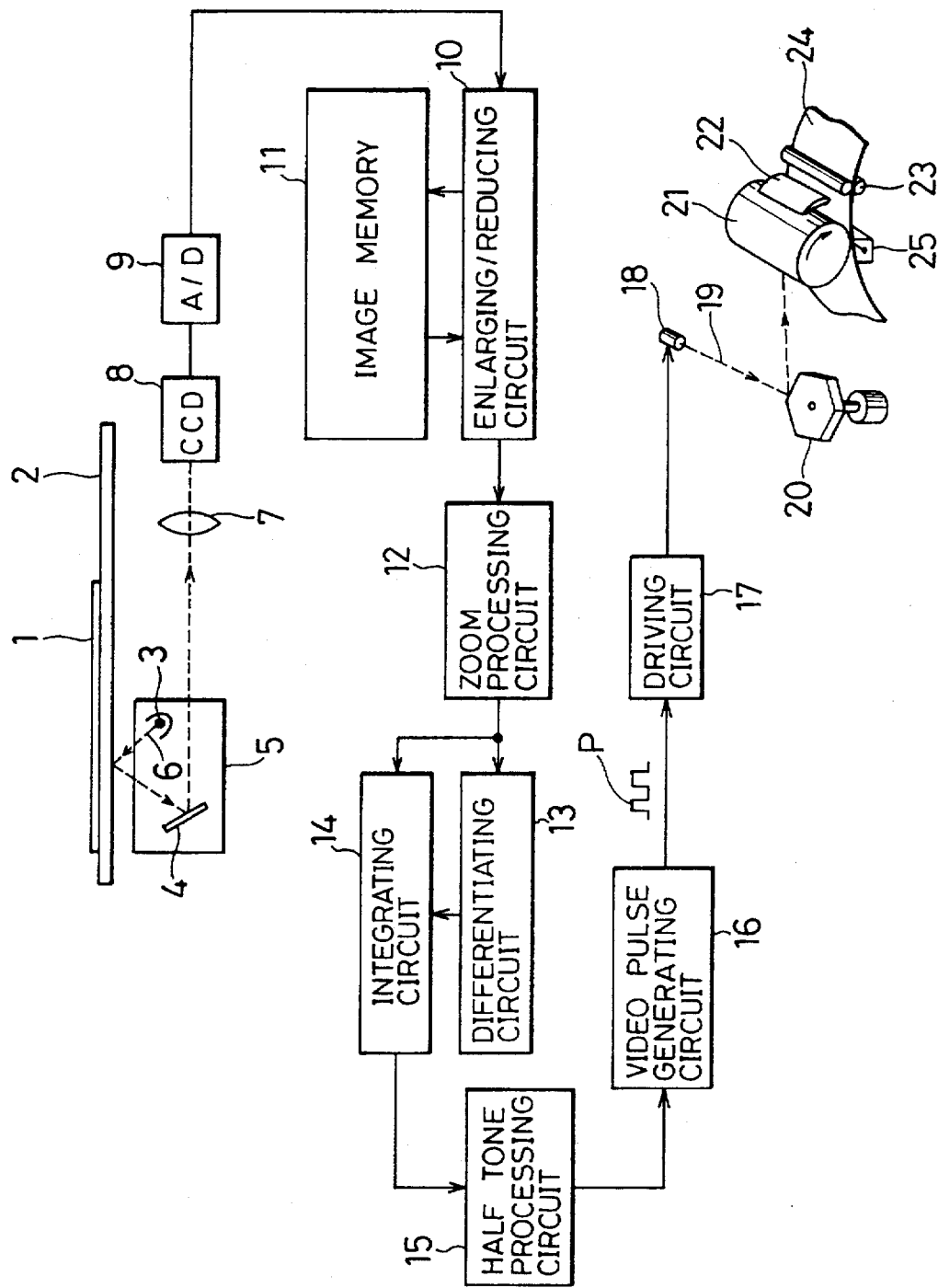
FIG. 1 is a block diagram of a digital electrographic copying machine embodying the present invention.

Referring to FIG. 1, there is schematically shown the arrangement of a digital electrographic copying machine embodying the present invention. Reference numeral 1 represents an original placed on a contact glass 2. The original 1 is scanned by a scanning optical system 5. The scanning optical system 5 includes a halogen lamp 3 which generates a reading out light 6 and a reflecting mirror 4 which directs the reflected light 6 to a condenser lens 7. The optical system 5 is movable toward the left and right of the figure (i.e. in the sub scanning direction of the original 1). The scanning speed of the scanning optical system 5 is controlled by the setting of the magnification, and the enlargement/reduction of the original image in the sub scanning direction is performed by the scanning optical system 5.

The light having read out the original image is formed into an image on a charge coupled device (CCD) 8 by the condenser lens 7. The image signal converted into an electric signal at the CCD 8 is converted to a digital signal by an analog to digital (A/D) converting circuit 9. The digital image data is written in and read out from an image memory 11 through a reducing/enlarging circuit 10. The read-out image data passes through a zoom processing circuit 12, is sharpened by a differentiating circuit 13, and smoothed by an integrating circuit 14.

Then, the data passes through a half tone processing circuit 15 so that a pulse P in accordance with the tone is outputted for each dot at a video pulse generating circuit 16. A driving circuit 17 drives a semiconductor laser 18 based on the pulse P. A laser beam 19 emitted from the semiconductor laser 18 is scanned by a polygonal mirror 20 to form a latent image on a photoreceptor drum 21. The latent image is developed into a toner image by a developer unit 22, and the toner image is transferred to a sheet 24 by a transfer charger 25. Reference numeral 23 represents a resist roller pair.

Figure 2:
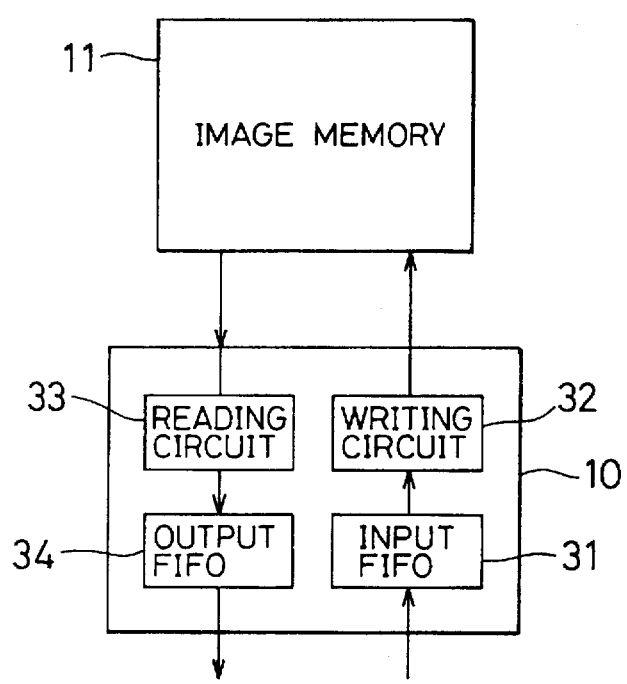
FIG. 2 is a block diagram of the arrangement of a relevant portion of the copying machine of FIG. 1.

The enlarging/reducing circuit 10 includes, as shown in FIG. 2, an input FIFO 31 serving as an input register (line memory) for counting an input timing of the image data, a writing circuit 32, a reading circuit 33, and an output FIFO 34 serving as an output register (line memory) for counting an output timing of the image data. As described later, in this embodiment, in reducing an image to ½, the image data is reduced to ½ in the main scanning direction by the FIFO 31 before written in the image memory 11, and when written in the image memory 11, the image data is reduced to ½ in the sub scanning direction.

In enlarging an image twice, the writing in the image memory 11 is performed at a normal speed. The image data is enlarged twice in the main scanning direction when read out from the image memory 11, and enlarged twice in the sub scanning direction by the output FIFO 34.

The enlarging/reducing circuit 10 sometimes performs neither enlargement nor reduction. Assume that the magnification range obtained by the scanning optical system 5 and the zoom processing circuit 12 is from 50% to 400%. In this embodiment, by adding the enlarging/reducing circuit 10, the total magnification range of the copying machine can be increased to from 25% to 800%.

Specifically, when a magnification within the range from 50% to 400% is specified, the enlargement/reduction by the enlarging/reducing circuit 10 is not performed, and the specified magnification is realized only by the scanning optical system 5 and the zoom processing circuit 12. When a magnification within the range from 25% to 49% is specified, the ½ reduction operation by the enlarging/reducing circuit 10 is performed, and when a magnification within the range from 401% to 800% is specified, the twice enlargement operation by the enlarging/reducing circuit 10 is performed.

Figure 3:
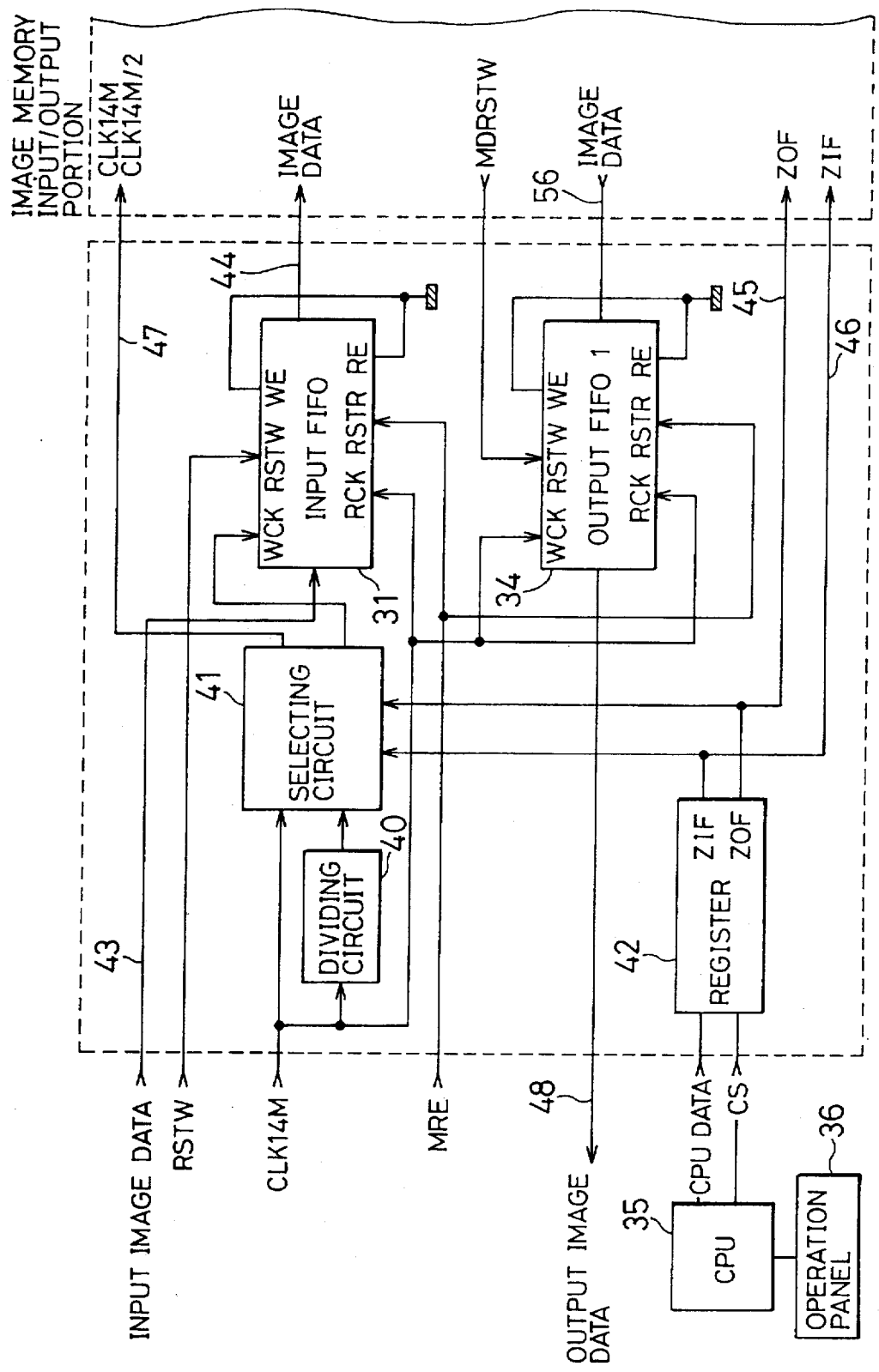
FIG. 3 is a circuit diagram of a part of an enlarging/reducing circuit of the copying machine of FIG. 1.

Referring to FIGS. 3 to 6, the reduction operation will be described. In FIG. 3, a dividing circuit 40 divides the frequency of an inputted clock CLK14M of 14 MHz into halves, i.e. 7 MHz. A selecting circuit 41 selects the clock CLK14M or its ½ clock based on a signal from a register 42.

The register 42 outputs a reduction control signal ZOF or an enlargement control signal ZIF based on a data from a central processing unit (CPU) 35. When the user operates an operation key of an operation panel 36 to specify a magnification within the range from 25% to 49%, the CPU 35 causes the register 42 to output the reduction control signal ZOF. In response thereto, the selecting circuit 41 selects the 7 MHz clock from the dividing circuit 40 and supplies the 7 MHz clock to a writing clock terminal WCK of the input FIFO 31 in the main scanning direction. Thus, the input image data inputted through a line 43 is written in the input FIFO 31 at the 7 MHz clock.

Figure 5:
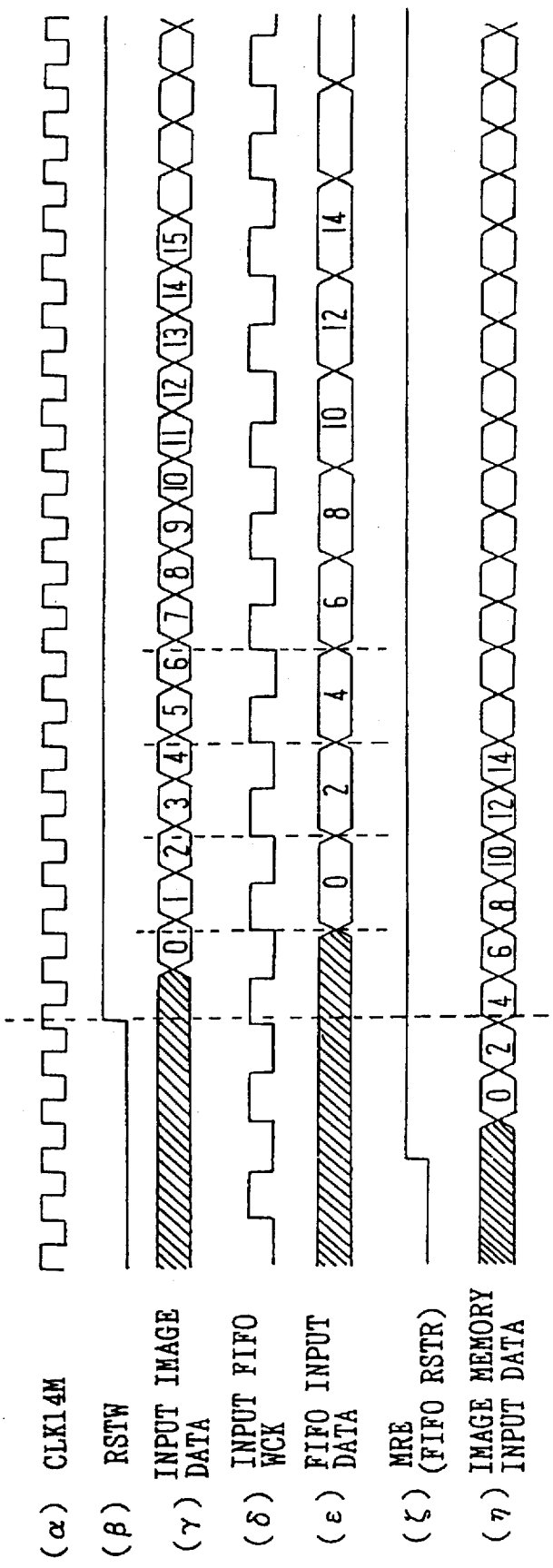
FIG. 5 is a time chart of signals relating to a main scanning direction operation of an input FIFO at the time of reduction.

Referring to FIG. 5, (α) represents the 14 MHz clock CLK14M. The input image data is written at the rise of the 7 MHz clock (δ) obtained by dividing the clock CLK14M to ½. Consequently, data of the image data for each dot (hereinafter, referred to as "dot data") is written in the input FIFO 31 every other dot data. Specifically, the data 0, 2, 4, 6, 8, 10, . . . of the data 0, 1, 2, 3, 4, 5, 6, 7, 8, . . . is written as shown at (ε) of FIG. 5. The numerals 0, 1, 2, . . . represent the dot data numbers (order of the dot data). Each dot data consists of 8 bits.

Since the clock CLK14M is supplied to a reading clock terminal RCK of the input FIFO 31 not through the selecting circuit 41 but directly, the reading out from the FIFO 31 is performed at the 14 MHz clock, so that the dot data 0, 2, 4, 6, 8, . . . of the image data are successively read out to an output line 44 at the timing of the clock CLK14M as shown at (η) of FIG. 5. The image data shown at (η) has been reduced to ½ (a half times) the input image data shown at (γ).

(β) of FIG. 5 represents a drive signal generated being delayed from a horizontal synchronizing signal by a predetermined time. The input FIFO 31 operates while this signal is at high level. (ζ) of FIG. 5 represents a drive signal for reading out. The reading out from the input FIFO 31 is performed while this signal is at high level.

Figure 4:
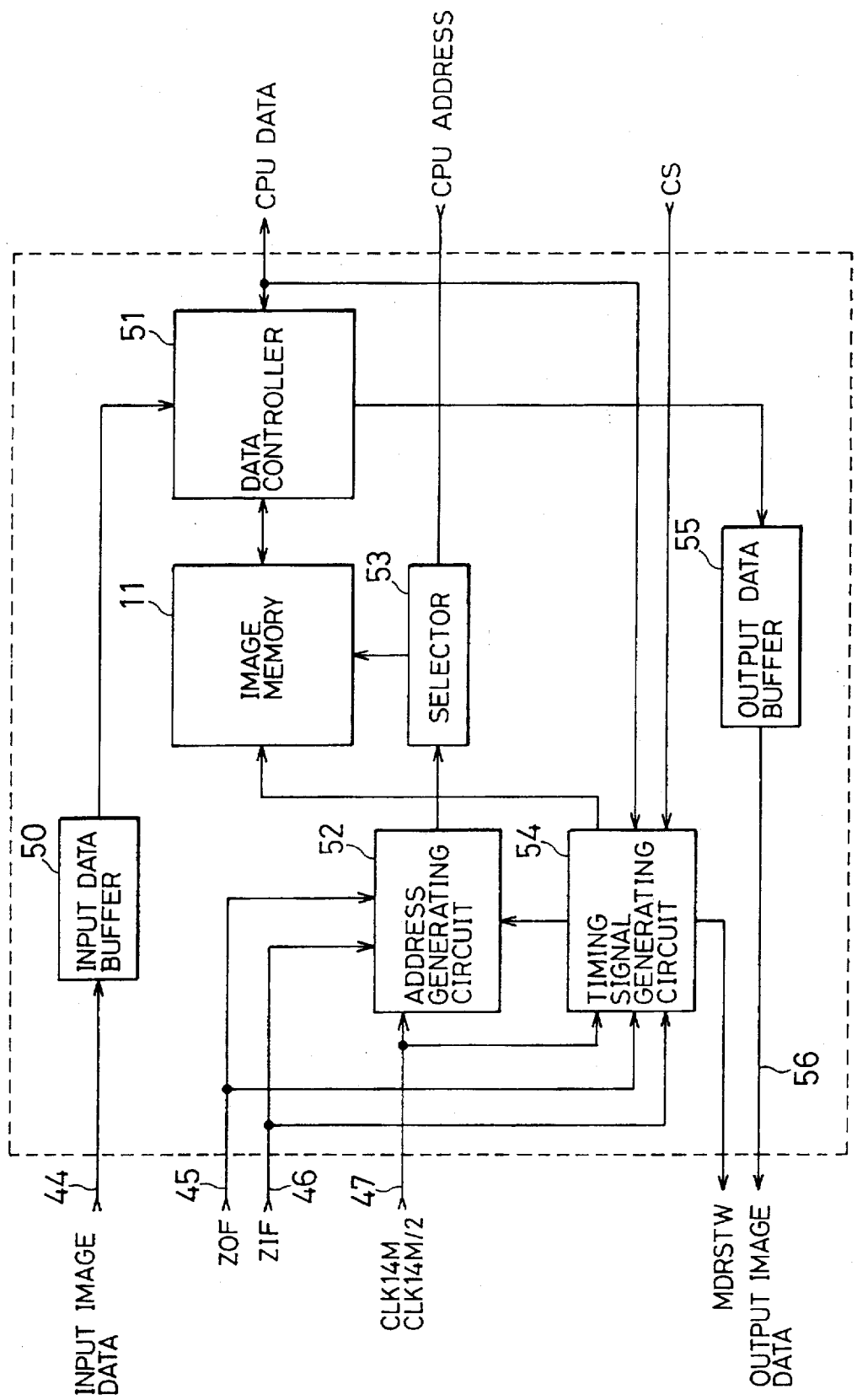
FIG. 4 is a circuit diagram of the remaining part of the enlarging/reducing circuit of the copying machine of FIG. 1.

The input image data reduced in the main scanning direction and generated at the output line 44 of the input FIFO 31 is directed to a data controller 51 through an input data buffer 50 of FIG. 4, and inputted in the image memory 11 by the data controller 51. The data controller 51 controls whether a data is inputted to or outputted from the image memory 11. The control is performed based on a data from the CPU 35.

The reduction control signal ZOF outputted from the register 42 of FIG. 3 is supplied not only to the selecting circuit 41 but to an address generating circuit 52 of FIG. 4 through a line 45. To the address generating circuit 52, the clock CLK14M or its ½ clock selected by the selecting circuit 41 is also provided through a line 47. These signals are also supplied to a timing signal generating circuit 54.

Figure 7:
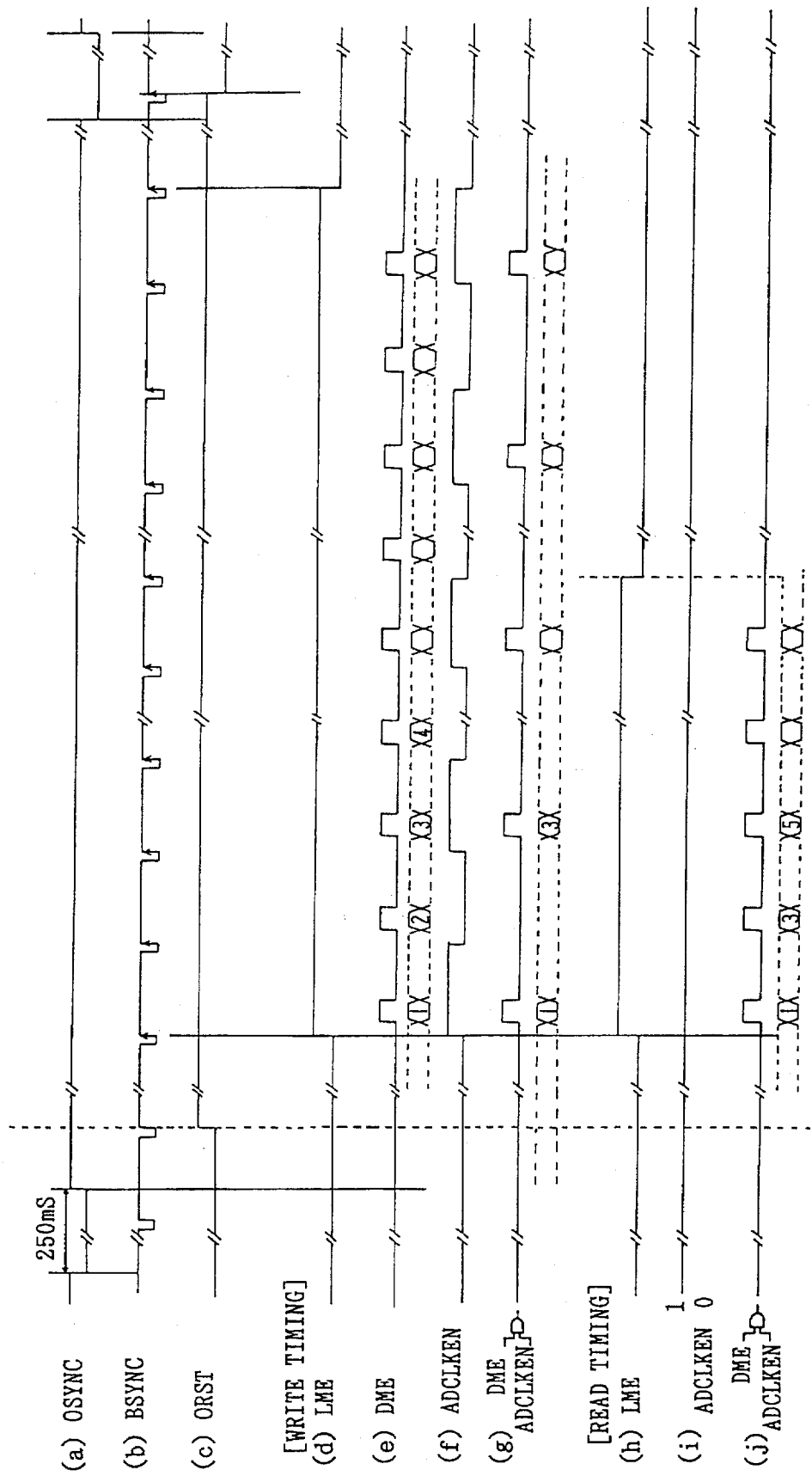
FIG. 7 is a time chart of signals relating to a sub scanning direction operation of an image memory at the time of reduction.

The above-described writing of the image data reduced to ½ in the main scanning direction to the image memory 11 is performed during the AND periods of an effective area signal DME shown at (e) of FIG. 7 and a memory address enable signal ADCLKEN (see (f) of FIG. 7) generated at the address generating circuit 52. For this reason, each line 1, 2, 3, 4, . . . of the image data is written every other line like 1, 3, . . . as shown at (g) of FIG. 7. Thereby, the image is reduced to ½ in the sub scanning direction.

The reading out from the image memory 11 is performed at the timing of (j) of FIG. 7. (j) which is an AND output of the DME shown at (e) and ADCLKEN shown at (f). Therefore, the image data stored in the memory 11 is read out in a horizontal period. The image data read out from the image memory 11 is reduced to ½ both in the main and sub scanning directions.

In FIG. 7, (a) represents a copy start signal OSYNC. Copying is effective after the rise of this signal. (b) represents a horizontal synchronizing signal HSYNC. (c) represents a signal synchronizing with an end of the read out original. This signal rises at the first horizontal synchronizing signal after the rise of OSYC. (d) and (h) represent a sub scanning direction effective range signal LME.

The ½ reduced image data written in and read out from the image memory 11 as described above is transmitted from the data controller 51 by way of an output data buffer 55 and a line 56 to the output FIFO 34 of FIG. 3. As is apparent from FIG. 3, the clock CLK14M is supplied to both the writing clock terminal WCK and the reading clock terminal RCK of the FIFO 34. Therefore, the writing in and reading out from the output FIFO 34 are performed in the normal manner.

Figure 6:
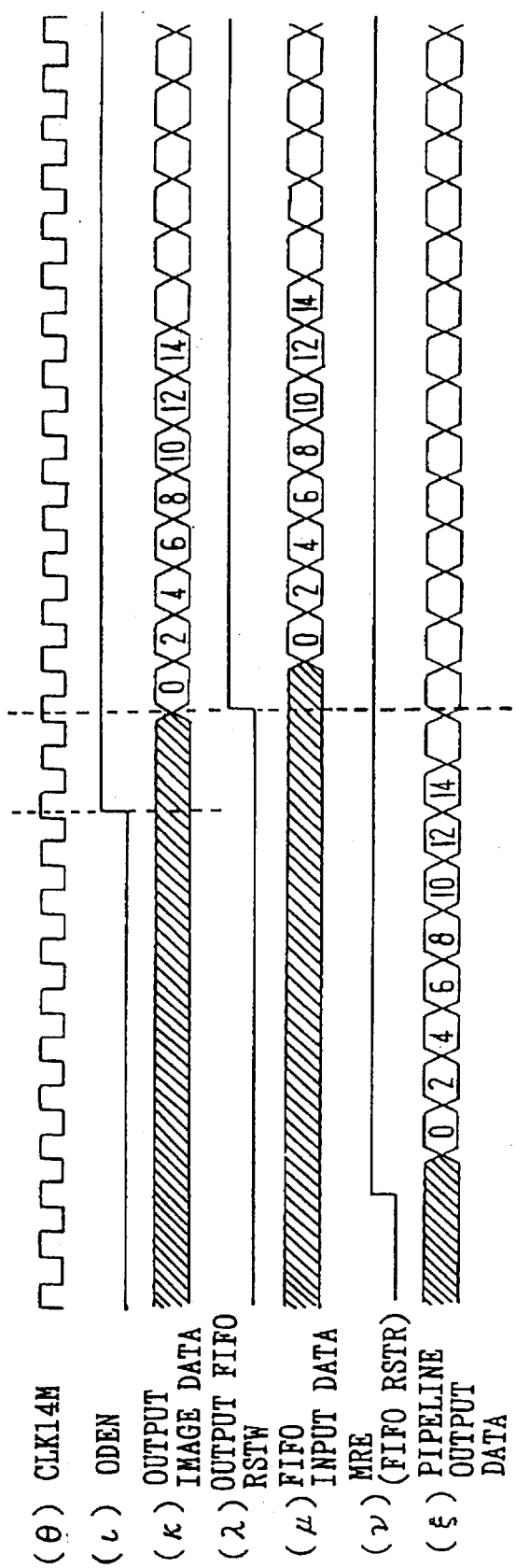
FIG. 6 is a time chart of signals relating a main scanning direction operation of an output FIFO at the time of reduction.

Thus, as is apparent from FIG. 6, the dot data (in the main scanning direction) of the image data directed from the output FIFO 34 out to its output line 48 is substantially the same as that obtained when read out from the image memory 11. Moreover, since a sub scanning direction writing signal MDRSTW and a reading signal MRE supplied to the output FIFO 34 are the same as (j) of FIG. 7, the sub scanning direction of the output image data of the FIFO 34 is the same as that outputted from the image memory 11.

Subsequently, the enlargement operation to enlarge the images data twice will be described. When the user operates the operation key of the operation panel 36 to specify a magnification within the range from 401% to 800%, the CPU 35 causes the register 42 to output the enlargement control signal ZIF. In response thereto, the selecting circuit 41 selects the clock CLK14M of 14 MHz and supplies the clock CLK14M to a clock terminal of the input FIFO 31.

Figure 8:
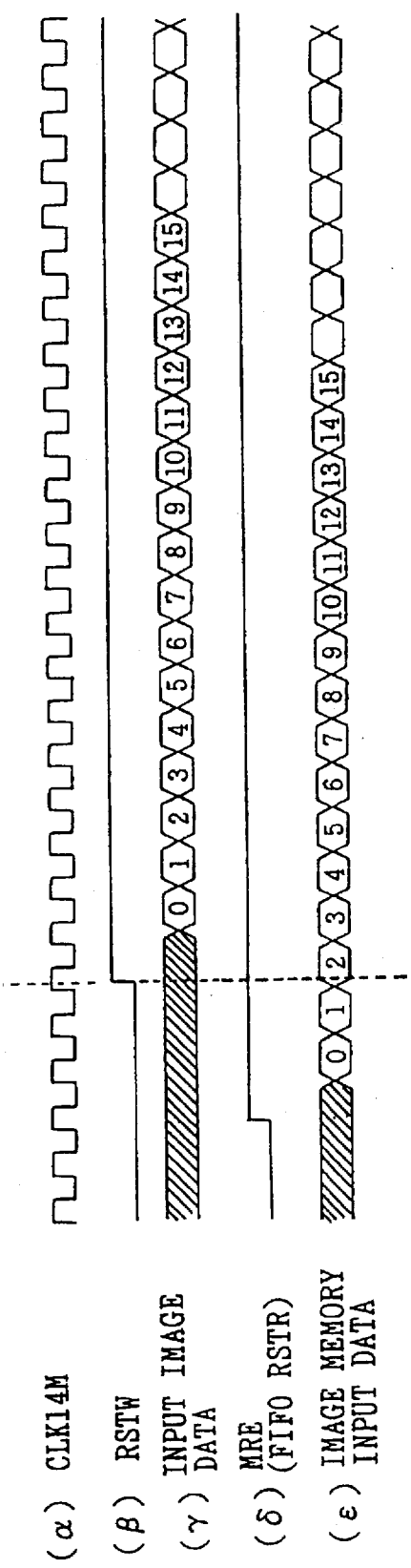
FIG. 8 is a time chart of signals relating to a main scanning direction operation of the input FIFO at the time of enlargement.

Therefore, the input FIFO 31 writes the input image data (γ) at the timing of the clock CLK14M as shown in FIG. 8. Thus, the writing in the FIFO 31 is performed in the normal manner and no enlargement processing is performed. (β) of FIG. 8 is a signal representative of an effective range of the input image data. (δ) is a signal representative of a effective range for writing.

Figure 9:
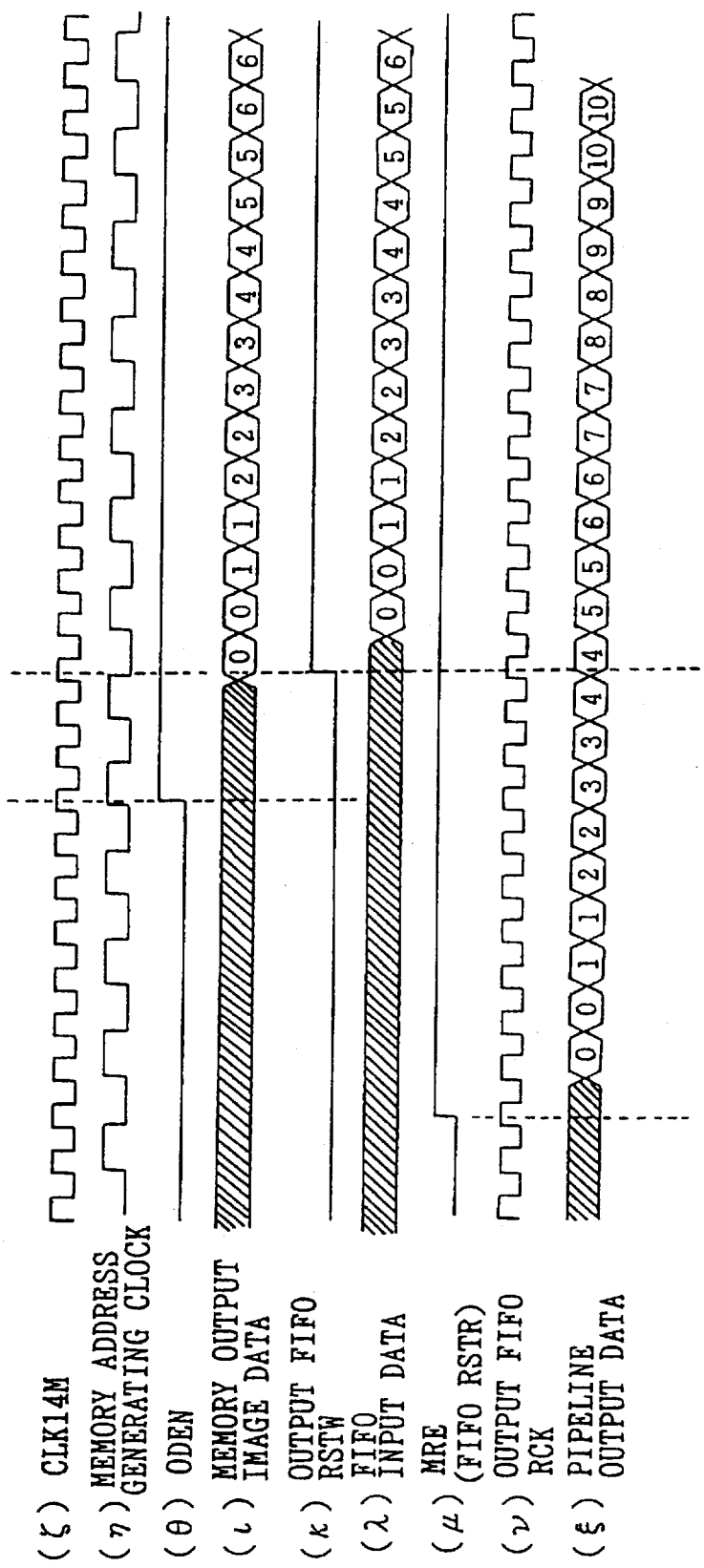
FIG. 9 is a time chart of signals relating to a main scanning direction operation of the output FIFO at the time of enlargement.

Referring to FIG. 9, there is shown a time chart of the reading out from the input FIFO 31. When the image data is read out, the 14 MHz clock CLK14M is supplied to the reading clock terminal RCK, so that the data is read out at this timing in the main scanning direction. Therefore, at this point of time, the data is not enlarged in the main scanning direction, and the data is not enlarged by the writing to the image memory 11 as described subsequently.

The writing in the image memory 11 is performed in the normal manner in the main scanning direction. Moreover, the image data is not enlarged in the scanning direction as shown at (f) of FIG. 11, and the data is written from the first line. Thus, the image data is written in the image memory 11 without being enlarged in the main direction and without being enlarged in the sub direction.

Figure 10:
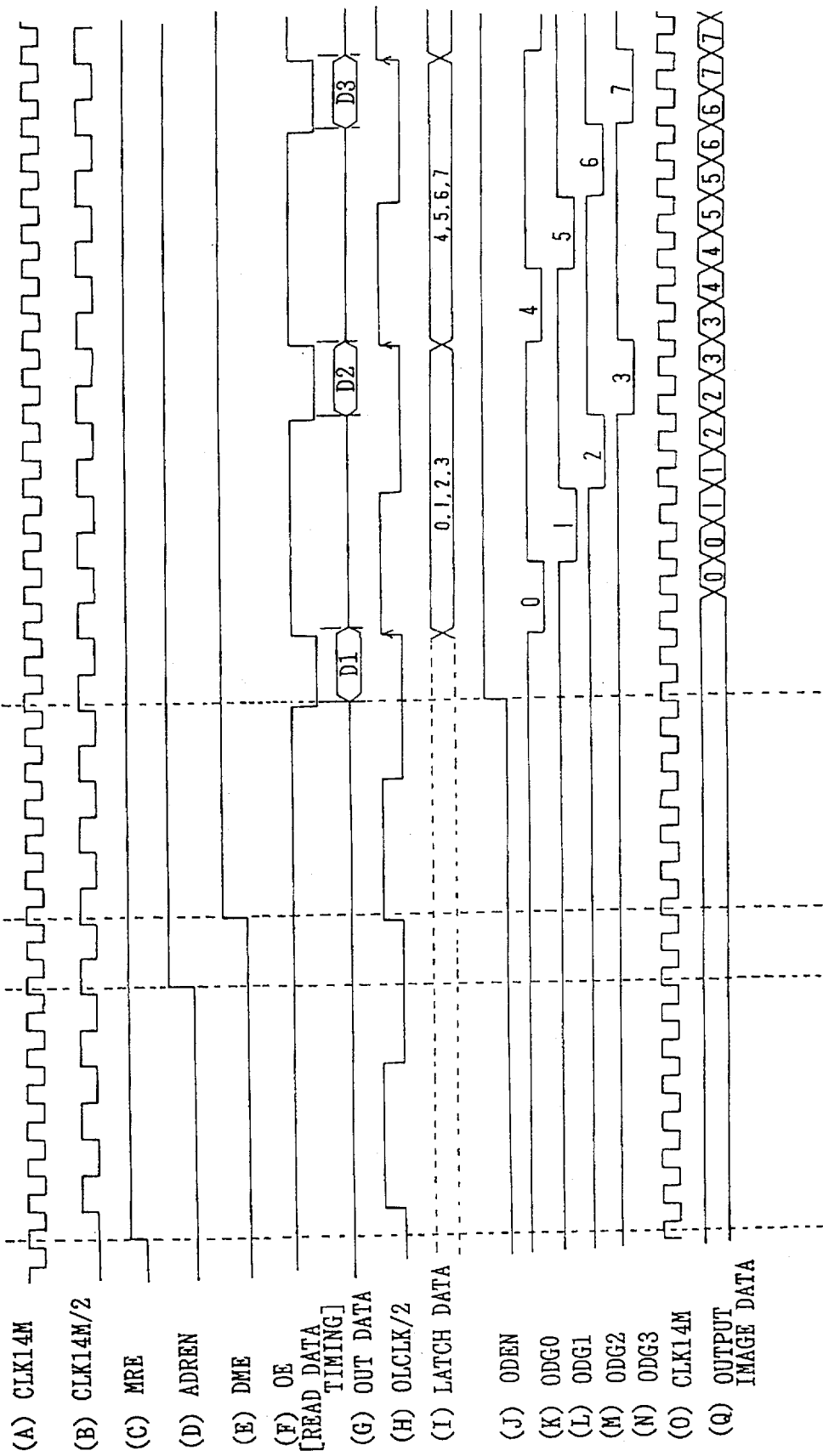
FIG. 10 is a time chart of signals relating to a main scanning direction operation of the image memory at the time of enlargement.

However, the image data is read out from the image memory 11 being enlarged twice in the main scanning direction as shown in FIG. 10. Moreover, although described later with reference to FIG. 11, the image data is enlarged twice in the sub scanning direction by the reading out from the image memory 11 and the output FIFO 34.

First, in FIG. 10, data D1, D2: D3, ... each consisting of 32 bits shown at (G) is latched by an output enable of the image memory 11 shown at (F) at the rise of a clock (H) ½ the reading clock shown at (B). The data D1, D2, D3, ... each include four dot data (0 to 4 in $D_1$, 5 to 7 in $D_2$, 8 to 11 in $D_3$). Each dot data consists of 8 bits as described above.

During the active (high level) period of an OD enable shown at (J), the data D1, D2, D3, ... are resolved into groups including four dot data (0 to 3, 4 to 7, ...) by gate open signals ODG0 to ODG3 shown at (K) to (N). When these are read out at the clock CLK14M, an image data in which each dot data is repeated twice is outputted in the main scanning direction as shown at (Q). This is nothing but that the image data is enlarged twice in the main scanning direction. As shown in FIG. 9, the main scanning direction is substantially the same as that outputted from the image memory 11 even though the image data is inputted to and outputted from the output FIFO 34.

With respect to the sub scanning direction, since the line data 1, 2, 3, ... written as shown at (f) of FIG. 11 is read out at an address generating clock enable ADCLKEN, the image data is read out in the order of 1, 2, 3, 4, ... every other line. The data read out from the image memory 11 is written in and read out from the output FIFO 34. In the writing and reading, since the data of each line is latched by an AND output of an output enable ODEN and the address generating clock enable ADCLKEN as shown at (f) and the latched data is read out in a horizontal period, the data of each line are read out twice as shown at (k), so that the image is enlarged twice in the sub scanning direction when outputted from the output FIFO 34.

Thus, the data is enlarged twice when read out from the image memory 11 both in the main and sub scanning directions. The enlarged image data is inputted to the output FIFO 34 of FIG. 3. However, since the reading is performed in the normal manner as shown in FIG. 9, the image data enlarged twice does not change when outputted from the output FIFO 34. The image data outputted from the output FIFO 34 is further enlargement-processed by the succeeding zoom processing circuit 12.

When a magnification within the range from 50% to 400% is specified in the above-described copying machine, since the specified magnification is realized only by the scanning optical system 5 and the zoom processing circuit 12, the enlarging/reducing circuit 10 does not perform the enlargement/reduction operation but merely performs the writing in and reading out from the image memory 11, and the FIFOs 31 and 34 merely count timing. When a magnification lower than the lower limit of the magnification range from 50% to 400% is specified, the image data is reduced to ½ by the enlarging/reducing circuit 10, and the desired reduction is achieved by the reduction to ½ and a reduction operation by the zoom processing circuit 12 and the scanning optical system 5. When a magnification higher than the upper limit of the magnification range is specified, the image data is enlarged twice by the enlarging/reducing circuit 10, and the desired enlargement is achieved by the twice enlargement and an enlargement operation by the zoom processing circuit 12 and the scanning optical system 5.

As described above, according to the present invention, a greater magnification range is realized. Many image forming apparatuses such as digital electrographic copying machines, printers, etc. incorporate an image memory. In the present invention, the magnification range is increased by using circuits for writing in and reading out from the image memory, so that the magnification range is increased comparatively easily and at a low cost for image forming apparatuses of such a type.

If the scanning speed range of the scanning optical system for reading the original is increased, the magnification range can be increased accordingly However, it is mechanically difficult to provide a large scanning speed range. According to the present invention, however, since the enlargement/ reduction is performed by the enlarging/reducing circuit, it is unnecessary to forcibly increase the scanning speed range of the optical system, so that the load on the scanning optical system and its driving mechanism is reduced.

In addition, since line memories for counting timing are provided for the reading in and writing out from the image memory and the enlargement and reduction operations in the main and sub scanning directions are allotted to the line memories and the image memory, the load is not concentrated on the enlargement/reduction processing. As a result, the processing is smoothly performed.

Obviously, many modifications and variations of the present invention are possible in light of the above teachings. It is therefore to be understood that within the scope of the appended claims, the invention may be practiced other than as specifically described.

What is claimed is:

1. An image forming apparatus which prints out an image based on input image data, comprising:
   a scanning optical system for scanning an original image to produce an original image signal:
   forming means for forming input image data based on the original image signal:
   an image memory for storing input image data therein;
   an input line memory for periodically storing a portion of input image data, and for outputting the stored portions of input image data in lines;
   writing means for periodically storing, in the image memory, a line of the portions of input image data output from the input line memory;
   reading means for reading, one or more times, each of a plurality of portions of input image data stored in the image memory; and
   an output line memory for storing lines of the read portions of input image data read by the reading means, and for outputting each line of the read portions of input image data one or more times.

2. An image forming apparatus according to claim 1, wherein
   the input line memory only stores every other portion of input image data in the image memory, to thereby reduce input image data in a main scanning direction of the image forming apparatus, and
   the writing means only stores, in the image memory, every other line of the portions of input image data output from the input line memory, to thereby reduce input image data in a sub scanning direction of the image forming apparatus when input image data is written in the image memory.

3. An image forming apparatus according to claim 1, wherein
   the reading means sequentially reads each of the plurality of portions of input image data stored in the image memory twice, thereby enlarging input image data in a main scanning direction of the image forming apparatus, and
   the output line memory sequentially outputs each line of the read portions of input image data twice, thereby enlarging input image data in the sub scanning direction of the image forming apparatus.

4. An image forming apparatus according to claim 1, wherein reduction of an original image in a sub scanning direction can be performed by varying a scanning speed of the scanning optical system and controlling the period at which the writing means stores, in the image memory, a line of the portions of input image data output from the input line memory.

5. An image forming apparatus according to claim 4, further including a zoom processing circuit, wherein reduction of an original image in a main scanning direction can be performed by employing the zoom processing circuit and controlling the period at which the input line memory stores a portion of input image data.

6. An image forming apparatus according to claim 1, wherein enlargement of an original image in a sub scanning direction can be performed by varying a scanning speed of the scanning optical system and controlling the number of times the output line memory outputs each line of the read portions of input image data output by the reading means.

7. An image forming apparatus according to claim 6, further including a zoom processing circuit, wherein enlargement of an original image in a main scanning direction can be performed by employing the zoom processing circuit and controlling the number of times the reading means reads each of the plurality of portions of input image data stored in the image memory.

8. An image forming apparatus according to claim 1, further including reduction control means for
   controlling the period at which the input line memory stores a portion of input image data, and
   controlling the period at which the writing means stores, in the image memory, a line of the portions of input image data output from the input line memory.

9. An image forming apparatus according to claim 1, further including enlargement control means for
   controlling the number of times the reading means reads each of the plurality of portions of input image data stored in the image memory, and
   controlling the number of times the output line memory outputs each line of the read portions of input image data.

10. An input image data enlargement and reduction apparatus, comprising:
    an image memory for storing input image data therein;
    an input line memory for periodically storing a portion of input image data, and for outputting the stored portions of input image data in lines;
    writing means for periodically storing, in the image memory, a line of the portions of input image data output from the input line memory;
    reading means for reading one or more times each of a plurality of portions of input image data stored in the image memory; and
    an output line memory for storing lines of the read portions of input image data read by the reading means, and for outputting each line of the read portions of input image data one or more times.

11. An input image data enlargement and reduction apparatus according to claim 10, wherein
    the input line memory only stores every other portion of input image data in the image memory, to thereby reduce input image data in a first direction, and
    the writing means only stores, in the image memory, every other line of the portions of input image data output from the input line memory, to thereby reduce input image data in a second direction when input image data is written in the image memory.

12. An input image data enlargement and reduction apparatus according to claim 10, wherein
    the reading means sequentially reads each of the plurality of portions of input image data stored in the image memory twice, thereby enlarging input image data in a first direction, and
    the output line memory sequentially outputs each line of the read portions of input image data twice, thereby enlarging input image data in a second direction.

13. An input image data enlargement and reduction apparatus according to claim 10, further including reduction control means for controlling the period at which the input line memory stores a portion of input image data, and controlling the period at which the writing means stores, in the image memory, a line of the portions of input image data output from the input line memory.

14. An input image data enlargement and reduction apparatus according to claim 10, further including enlargement control means for controlling the number of times the reading means reads each of the plurality of portions of input image data stored in the image memory, and controlling the number of times the output line memory outputs each line of the read portions of input image data.

* * * * *